US012311712B2

(12) United States Patent
Algüera et al.

(10) Patent No.: US 12,311,712 B2
(45) Date of Patent: May 27, 2025

(54) CABLE ROUTING DEVICE

(71) Applicant: JOST-WERKE DEUTSCHLAND GMBH, Neu-Isenburg (DE)

(72) Inventors: José Manuel Algüera, Aschaffenburg (DE); Rudolf Schlotthauer, Neu-Isenburg (DE); Paul Hansen, Neu-Isenburg (DE)

(73) Assignee: JOST-WERKE DEUTSCHLAND GMBH, Neu-Isenburg (DE)

( * ) Notice: Subject to any disclaimer, the term of this patent is extended or adjusted under 35 U.S.C. 154(b) by 0 days.

(21) Appl. No.: 18/683,645

(22) PCT Filed: Aug. 14, 2022

(86) PCT No.: PCT/IB2022/057599
§ 371 (c)(1),
(2) Date: Feb. 14, 2024

(87) PCT Pub. No.: WO2023/021391
PCT Pub. Date: Feb. 23, 2023

(65) Prior Publication Data
US 2024/0262143 A1    Aug. 8, 2024

(30) Foreign Application Priority Data

Aug. 20, 2021  (DE) .......................... 102021004253.0

(51) Int. Cl.
*B60D 1/62* (2006.01)
*H02G 11/00* (2006.01)

(52) U.S. Cl.
CPC ............. *B60D 1/62* (2013.01); *H02G 11/003* (2013.01)

(58) Field of Classification Search
CPC .......... B62D 53/125; B60D 1/62; B60D 1/64; H02G 11/00; H02G 11/003; H02G 11/006; B60R 16/0207; B60R 16/0215
USPC ................. 280/422, 423.1; 248/74.3; 174/95
See application file for complete search history.

(56) References Cited

U.S. PATENT DOCUMENTS

| 2,250,042 | A | * | 7/1941 | Sundt | ................... | H01R 13/562 |
| | | | | | | 267/180 |
| 4,076,272 | A | | 2/1978 | Penton | | |
| 4,092,034 | A | * | 5/1978 | Becker | ................... | B62D 53/00 |
| | | | | | | 439/36 |

(Continued)

FOREIGN PATENT DOCUMENTS

| CN | 112622538 A | 4/2021 |
| DE |   817556 C  | 10/1951 |

(Continued)

*Primary Examiner* — Anne Marie M Boehler
(74) *Attorney, Agent, or Firm* — Hudak, Shunk & Farine Co. LPA

(57) ABSTRACT

A cable routing device for connecting a line strand to a carrier element which can be moved with respect to the vehicle, wherein the cable routing device has a carrier element, fastened pivotably to the vehicle, and a cable store, in which at least part of the line strand is accommodated. Based on the problem of providing a cable routing device of compact design which is suitable for ensuring low sag of a line strand with a large diameter, the problem is solved by virtue of the fact that a spring element is arranged between the carrier element and the cable store, by which spring element, the line strand is supported loosely.

22 Claims, 6 Drawing Sheets

(56) References Cited

U.S. PATENT DOCUMENTS

| | | | | |
|---|---|---|---|---|
| 4,103,931 | A | * | 8/1978 | Weiss .................... B62D 53/067 |
| | | | | 280/149.2 |
| 5,824,960 | A | * | 10/1998 | Markling ............... H02G 11/00 |
| | | | | 174/135 |
| 6,168,182 | B1 | * | 1/2001 | Ford ....................... B60D 1/167 |
| | | | | 280/422 |
| 6,734,367 | B2 | * | 5/2004 | Haniya ................. H02G 11/006 |
| | | | | 248/51 |
| 6,930,244 | B1 | * | 8/2005 | Nebel .................. B60R 16/0207 |
| | | | | 248/65 |
| 11,712,937 | B1 | * | 8/2023 | Daugherty ............... B60D 1/62 |
| | | | | 280/421 |
| 2005/0236528 | A1 | | 10/2005 | Karlinger |
| 2007/0025061 | A1 | * | 2/2007 | Kogure ................ H02G 11/006 |
| | | | | 361/437 |
| 2008/0036175 | A1 | * | 2/2008 | Alguera ................ B60T 17/043 |
| | | | | 280/420 |
| 2012/0319379 | A1 | | 12/2012 | Kolda et al. |
| 2017/0104318 | A1 | * | 4/2017 | Uno .................... H02G 11/003 |
| 2018/0241189 | A1 | * | 8/2018 | Alger, Jr. ............. H02G 11/006 |

FOREIGN PATENT DOCUMENTS

| | | |
|---|---|---|
| DE | 102004024333 A1 | 12/2005 |
| DE | 102004044992 A1 | 4/2006 |
| DE | 202007005412 U1 | 8/2007 |
| DE | 102018106677 B3 | 6/2019 |
| DE | 102018100025 A1 | 7/2019 |
| EP | 0084712 A2 | 8/1983 |
| GB | 2204844 A | 11/1988 |
| JP | 61060345 A * | 3/1986 ......... B60R 16/0207 |
| WO | 2004020321 A1 | 3/2004 |

* cited by examiner

CABLE ROUTING DEVICE

FIELD OF THE INVENTION

The invention relates to a cable routing device for connecting a line strand to a carrier element which can be moved with respect to a vehicle, wherein the cable routing device has the carrier element, fastened pivotably to the vehicle, and a cable store, in which at least part of the line strand is accommodated. Furthermore, the invention is also implemented in combination with a semi-trailer, trailer or articulated vehicle.

BACKGROUND OF THE INVENTION

Semi-trailers usually consist of a towing vehicle and a semi-trailer, which are releasably connected to one another by means of a fifth wheel coupling arranged on the towing vehicle and a king pin attached to the semi-trailer. This makes it possible to park a semi-trailer connected to the towing vehicle and pick up another semi-trailer instead. For such coupling processes, the driver usually has to get out and mechanically open the fifth wheel coupling to uncouple or, after coupling, check the locking status of the king pin that has been correctly inserted into the fifth wheel coupling.

An articulated truck and trailer assembly usually consists of a towing vehicle and a trailer coupled to it, which is releasably attached to a trailer coupling of the towing vehicle by means of a drawbar.

An articulated vehicle is, for example, an articulated bus, as used in local public transport. An articulated vehicle can also be, for example, a wheel loader, a road roller or an articulated dump truck. The articulated vehicles have in common that they are designed from a first and second vehicle part connected with a swivel joint in between. The first and second vehicle parts cannot be separated from one another when driving. When the articulated vehicle corners, the first and second vehicle parts change their relative position to one another.

In the past, there have been efforts to automate the coupling and uncoupling process, for example of a semi-trailer to the towing vehicle, and to also establish a connection between supply lines. For example, from DE 10 2004 024 333 A1 a plug-in coupling system has become known, in which a wedge pivot frame pivotably mounted to the king pin is inserted into an entry opening of the fifth wheel coupling during the coupling of the semi-trailer with the towing vehicle and is held there after the king pin has been locked. While the semi-trailer is cornering, the wedge swivel frame pivots relative to the semi-trailer, so that the supply lines must be dimensioned accordingly long in order not to break off when cornering sharply. However, when driving straight ahead, the supply lines sag and could be damaged.

For this reason, it is proposed in DE 10 2004 044 992 A1 to attach a line storage device to the semi-trailer, in which the supply lines emerging from the wedge swivel frame are wound on a spring-loaded drum disk and unwound under tension when cornering. A major disadvantage of this known line storage lies in the comparatively large installation space requirement and the problem of having to accommodate a line strand with an even larger number of supply lines on the drum disk without falling below the minimum permissible bending radius provided for the line strand.

SUMMARY OF THE INVENTION

The invention was based on the object of providing a cable routing device of compact design which is suitable for ensuring low sag of a line strand with a large diameter.

The object is achieved with a cable routing device for connecting a line strand to a carrier element which can be moved with respect to a vehicle, wherein the cable routing device has the carrier element, fastened pivotably to the vehicle, and a cable store, in which at least part of the line strand is accommodated, wherein a spring element is arranged between the carrier element and the cable store, by which spring element the line strand is supported loosely, and wherein the line strand is supported by the spring element in such a way that only the sliding friction resulting from its weight has to be overcome for axial movement. A spring element is understood to be a component that is reversible under the expected operating loads and can be stretched in its axial extent between a maximum length and a minimum length. The spring element can in principle be made of spring steel, plastic or a rubber mixture. Basically, the line strand is always placed loosely in, on or on the spring element and is otherwise not connected to it.

The term "loose" means a mechanical decoupling of the spring element and line strand. Consequently, the spring element can lengthen or shorten independently of the line strand. A relative movement to the spring element can take place in the axial direction of the line strand. The line strand is supported by the spring element and only needs to overcome the sliding friction resulting from its weight for axial movement. In the radial direction, the line strand is guided through the spring element with a small amount of movement.

While cornering, the carrier element changes its relative position to the cable store, so that the distance between the carrier element and the cable store increases and the line strand has to bridge this larger distance. In this situation, part of the line strand located in the cable store is pulled out of the cable store by the carrier element. If the vehicle drives straight ahead again, the distance between the carrier element and the cable store is reduced, so that the line strand needs to bridge a smaller distance. In this situation, the line strand is partially pushed back into the cable store by the carrier element.

On the one hand, the spring element ensures that the line strand is always supported and does not sag downwards and can therefore collide with other vehicle parts.

When the line strand moves into the cable store, the spring element prevents the line strand from migrating laterally and ensures a smooth entry into the cable store.

The spring element is expediently attached to the carrier element and/or to the cable store. As a result, the spring element is held stationary in its axial direction and the line strand slides decoupled from it into the cable store. If the spring element is fixed to both the carrier element and the cable store, this results in the additional advantage that the carrier element is forcibly aligned due to the spring preload of the spring element, for example after uncoupling. In particular, if the carrier element is a wedge swivel frame, this is in a correct position for renewed coupling due to the forced alignment.

The spring element is advantageously a coil spring, an expandable hose or an elastic bellows. The coil spring, the expandable hose or bellows can completely surround the line strand in the circumferential direction, whereby it is guided and protected particularly well in all directions.

The spring element should have an anti-twist device or be installed secured against rotation about its longitudinal axis. This ensures that the spring element, particularly if the spring element is designed as a coil spring, cannot rotate out of the fastening by rotating about its longitudinal axis.

The line strand is preferably inserted in the cable store as a loop. The loop can, for example, be designed with a U-shape, an S-shape, a Q-shape or as a tightening loop.

The loop is in particular spanned by an incoming section and an outgoing section and encloses a maximum loop angle of 270°, particularly preferably a maximum of 205°, very particularly preferably 200°, regardless of the position of the carrier element. In one embodiment of the loop as a tightening loop, loop angles of 360° to 400° can be achieved. The incoming section moves out of the cable store when the carrier element pivots and pulls the loop together. The outgoing section is preferably fixed at the end in or on the cable store. When driving straight ahead, the incoming section has predominantly migrated into the cable store.

Expediently, regardless of the relative position of the carrier element, the direction of the loop is always the same. The incoming section and the outgoing section typically do not cross each other in a U-shaped, S-shaped or Q-shaped loop. In a tightening loop, the incoming and outgoing sections cross each other within the cable store.

In a straight-ahead position of the carrier element, the loop within the cable store can have a maximum loop length. The loop is pushed backwards through the incoming section and thereby accommodates a larger section of the line strand within the cable store.

In a cornering position of the carrier element, however, the loop can have a minimum loop length within the cable store. Part of the line strand has been pulled out of the cable store by the incoming section and the loop has changed its position in the opposite direction, thereby reducing its radius.

The cable store expediently comprises a box-shaped or cup-shaped housing and the line strand is placed on a bottom wall of the box-shaped or cup-shaped housing. When the loop changes position, it slides over the bottom wall, meaning that moving parts and tensioning elements are no longer needed.

Advantageously, the spring element is attached to the carrier element with a front guidance console and/or to the cable store with a rear guidance console. The front and rear guidance consoles pivot together with the spring element, thereby reducing the risk of irreversible kinks in the spring element.

Particularly preferred is an embodiment in which the front and/or rear guidance console is mounted by means of a pivot bearing about a pivot axis that is vertical in the installed position. The pivot bearing of the front guidance console can engage in particular on the carrier element and the pivot bearing of the rear guidance console can engage on the housing of the cable store.

According to a further embodiment, guiding elements that diverge outwards are arranged on opposite sides of the front and/or rear guidance console. If the carrier element swings out particularly strongly, the spring element rests on the inside of the curve against the guiding element arranged there, which further reduces the risk of kinks in the spring element.

Conveniently, in the installed position, the guiding elements protrude backwards and/or forwards relative to the front and/or rear guidance console, that is to say in the rearward direction in relation to the forward travel of the tractor-trailer. Facing inner sides of the guiding elements can be designed with a curvature in opposite directions. The curvature should be as continuous as possible to prevent kinks in the spring element.

The line strand preferably comprises a plurality of supply lines which are covered and/or held together by at least one protective hose. The protective hose protects the supply lines from mechanical damage, especially if they constantly make a sliding movement relative to the spring element and the housing, for example on its bottom wall. It is particularly advantageous to design the protective hose with a surface that ensures a particularly favorable coefficient of friction. This in turn reduces wear and enables a particularly uniform sliding movement of the line strand into and out of the cable store.

A carrier element plug-element is expediently provided on the carrier element and/or on or adjacent to the cable store a cable store plug-element. With the help of the carrier element plug-element, an electrical, pneumatic and, if necessary, hydraulic connection to the supply circuit of the towing vehicle is possible. The carrier element plug-element will often be designed as a plug and the complementary component of the towing vehicle will be designed as a socket for safety reasons, since this is live. The carrier element plug element is connected or released during each coupling and uncoupling process. The cable store plug-element enables the cable routing device to be connected to the on-board electrical system of the semi-trailer, typically via a complementary plug component of the semi-trailer, and will regularly be designed as a socket since this is current-carrying. Usually, the cable store plug-element is only disconnected for repair and maintenance purposes.

Advantageously, the carrier element is a wedge pivot frame that can be attached to a semi-trailer or a plug console that can be attached to a trailer. The cable store is then provided together with automated coupling systems for connecting the supply lines of the semi-trailer or trailer to the towing vehicle.

The invention also extends to a combination of a cable routing device explained above with a vehicle designed as a semi-trailer, the carrier element being a wedge pivot frame which can be pivoted about a king pin.

The cable store is expediently arranged under a trailer floor of the semi-trailer. This installation position allows direct access for assembly and repair purposes. In addition, the cable store and the entire cable routing device can be installed without major structural modifications to the semi-trailer.

Particularly preferred is an embodiment in which the cable store is attached to an underside of a trailer floor or to a chassis component or to an attachment of the semi-trailer, such as the support jacks. A chassis component is understood to mean, in particular, a longitudinal member or cross member of the vehicle frame of the semi-trailer or the mounting brackets for the support jacks.

The loop of the line strand can have a section entering the cable store and an outgoing section, both of which are aligned towards a front of the semi-trailer. The concave side of the loop faces the front of the semi-trailer.

According to an alternative embodiment, the vehicle can also be a trailer and the carrier element can be a connector console that is movably mounted to a drawbar. The connector console pivots regularly when driving, for example when driving through a curve, with a complementary shaped plug socket on the towing vehicle side into which it is inserted. This pivoting movement requires the line strand to be carried along by the trailer, with the line strand being pulled further out of the cable store in a cornering position than in a straight-ahead position. Mostly, the connector console is pivoted to the trailer's drawbar.

Conveniently, the cable store is attached to or mounted stationary to the drawbar of the trailer.

According to yet another embodiment, the vehicle is designed as an articulated vehicle and has a first and second vehicle part separated from one another by a swivel joint. The carrier element is a collecting console arranged on the first vehicle part and the cable store is preferably fixed in place to the second vehicle part. With the help of the cable store, a largely slack-free connection of the line strand to the relatively movable collecting console of the first vehicle part can be achieved, regardless of the bending position of the first and second vehicle parts relative to one another.

BRIEF DESCRIPTION OF THE DRAWINGS

For better understanding, the invention is explained below using 12 Figures showing in.

DETAILED DESCRIPTION OF THE INVENTION

Figure 1:
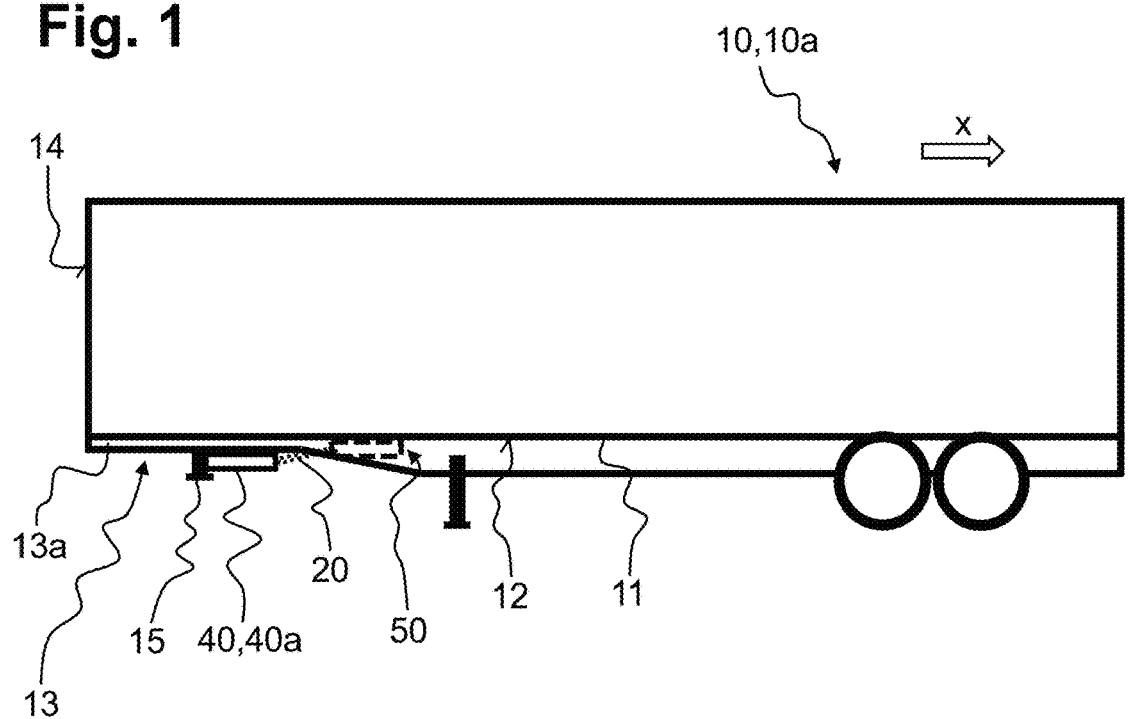
FIG. 1: a side view of a vehicle in form of a semi-trailer with a cable routing device arranged on it.
Figure 2:
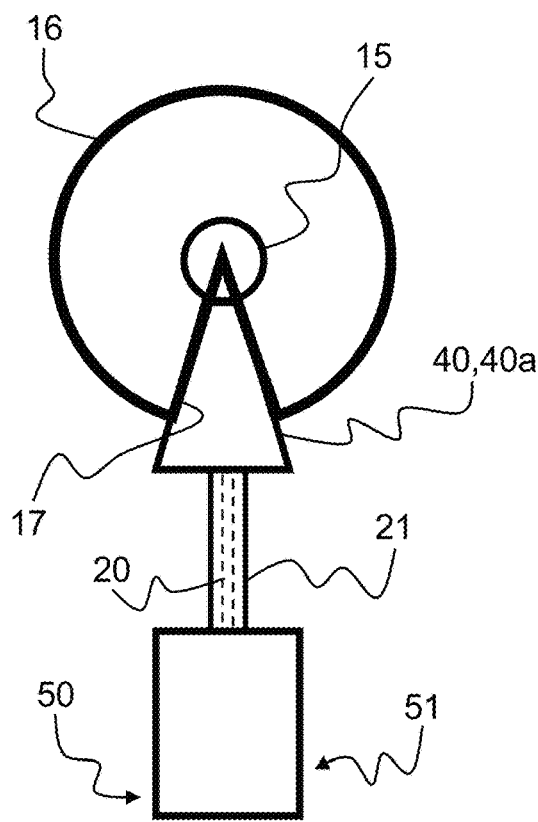
FIG. 2: a top view of a fifth wheel coupling with retracted carrier element as a wedge pivot frame and cable routing device in a straight-ahead position.
Figure 3:
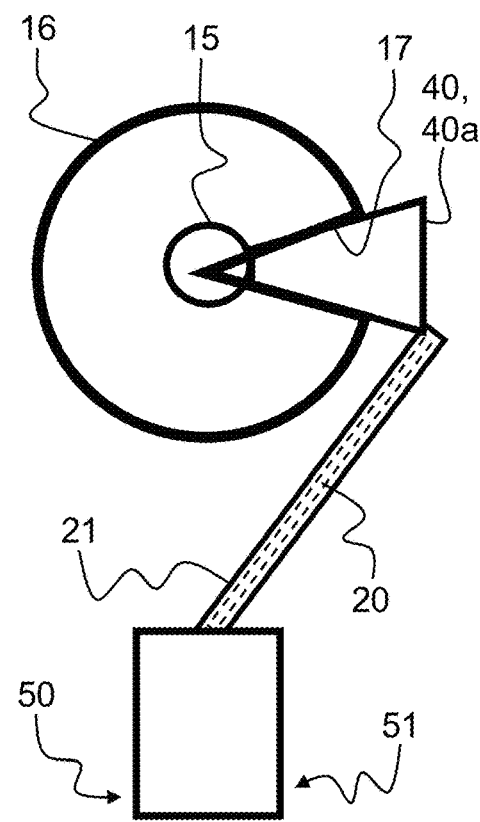
FIG. 3: a top view according to FIG. 2 in a cornering position.

FIG. 1 shows a side view of a vehicle 10 in the form of a semi-trailer 10a, which can be driven into a fifth wheel coupling 16, shown schematically in FIG. 2 and FIG. 3, of a towing vehicle not shown here, by means of a king pin 15 projecting downwards in relation to a bottom 12 of a semi-trailer floor 11 and can be locked to the fifth wheel coupling 16. The fifth wheel coupling 16 has at its end facing the semi-trailer 10a during coupling a V-shaped widened entry opening 17, through which the king pin 15 is guided laterally during a further approach of the towing vehicle and semi-trailer 10a and is finally locked in its end position.

The king pin 15 is located in a section adjacent to the front 14 of the semi-trailer 10a. Typically, the trailer floor 11 is supported by two longitudinal beams 13a running in the longitudinal axis of the vehicle, wherein the longitudinal beams 13a form chassis components 13 together with further cross beams which have been omitted for reasons of clarity.

A carrier element 40 in the form of a wedge pivot frame 40a is mounted on the semi-trailer 10a so as to be pivotable about the king pin 15, wherein an electrical and a pneumatic connection to the towing vehicle is established via the wedge pivot frame 40a, particularly during an automatic coupling process.

When the king pin 15 is retracted into the fifth wheel coupling 16, the wedge pivot frame 40a also enters the entry opening 17 of the fifth wheel coupling 16 and is supported laterally in it due to its shape, which is complementary to the entry opening 17.

A line strand 20 runs from the wedge pivot frame 40a in the rearward direction x of the semi-trailer 10a to a cable store 50 which is fixed in place on the trailer floor 11 or one of the chassis components 13. Depending on the relative position of the semi-trailer 10a to the fifth wheel coupling 16, the cable store 50 takes up part of the line strand 20 or releases part of the line strand 20, thereby preventing the line strand 20 from sagging during straight-ahead travel.

A straight-ahead position of the towing vehicle and semi-trailer 10a can be seen in FIG. 2. The wedge pivot frame 40a, the line strand 20 and the cable store 50 are essentially aligned in the longitudinal axis of the vehicle of the semi-trailer 10a. In this position, the line strand 20 has to bridge a comparatively small distance between the wedge pivot frame 40a and the cable store 50. Due to its rigidity, the line strand 20 has been partially pressed into the cable store 50 by the wedge pivot frame 40a. A spring element 21 is arranged between the wedge pivot frame 40a and the cable store 50, which encases the line strand 20 over the entire distance. The spring element 21 has its shortest axial length between the wedge pivot frame 40a and the line strand 50.

FIG. 3 shows an extreme cornering position, as can occur particularly when maneuvering. The wedge pivot frame 40a has swung out counterclockwise by approximately 90° and has pulled part of the line strand 20 out of the cable store 50. The cable store 50 thereby prevents the line strand 20 from being torn off from the wedge pivot frame 40a. The spring element 21 has correspondingly extended its axial length due to the pivoting path carried out by the wedge pivoting frame 40a. However, the movement of the line strand 20 takes place independently of the expansion of the spring element 21, since they are not connected to one another. The line strand 20 only rests on the spring element 21 with its weight, but is otherwise not kinematically coupled to the spring element 21.

Figure 4:
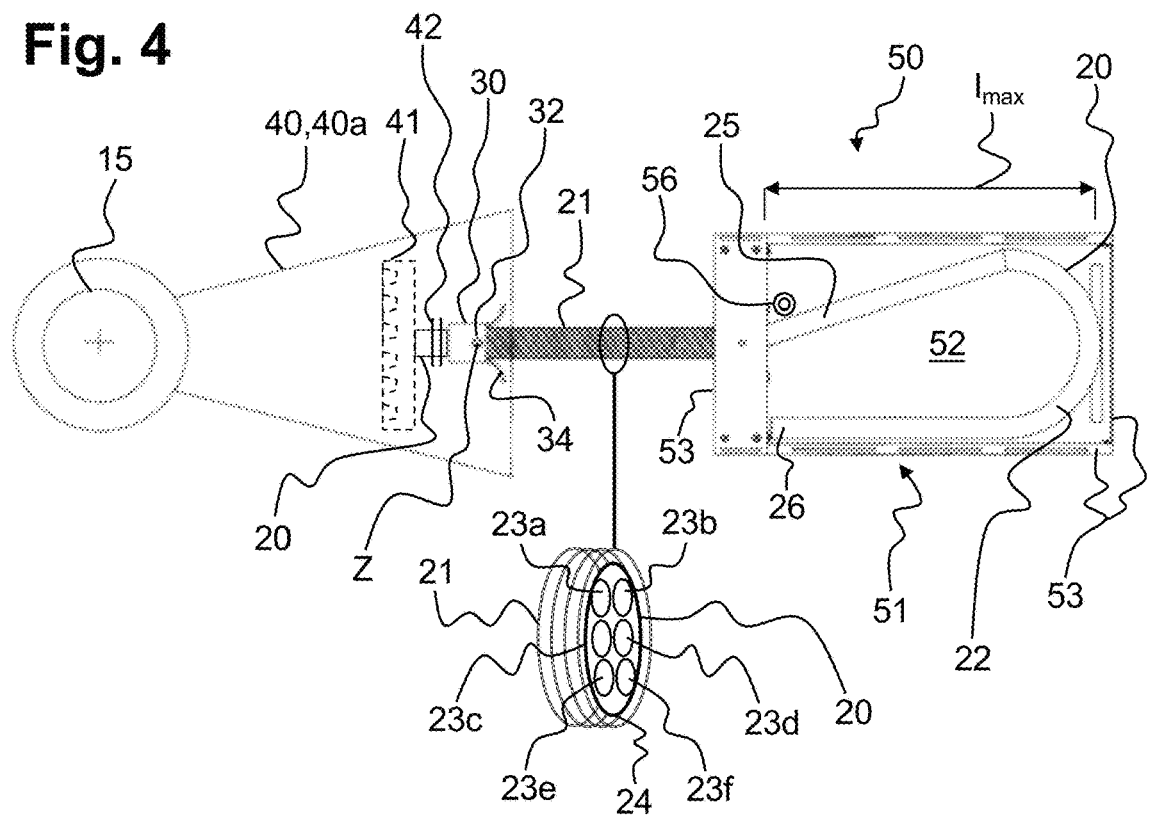
FIG. 4: a top view of the wedge pivot frame, line strand with spring element and covered cable store in a straight-ahead position.

In FIG. 4, the wedge pivot frame 40a is aligned in a straight-ahead position. When the semi-trailer is coupled to a towing vehicle, a wedge pivot frame plug-element 41 is connected to a complementary plug element of the towing vehicle, whereby at least one electrical and pneumatic connection is established. The wedge pivot frame plug-element 41 is electrically connected to the line strand 20, which comprises a total of six supply lines 23a, 23b, 23c, 23d, 23e, 23f, of which four supply lines 23a, 23b, 23c, 23d are electrical lines and two supply lines 23e, 23f are designed as pneumatic lines. The always several supply lines 23a, 23b, 23c, 23d, 23e, 23f are inserted together into a protective hose 24, which, in addition to a mechanical protective function for the supply lines 23a, 23b, 23c, 23d, 23e, 23f, also has a particularly smooth surface, which reduces sliding friction between the line strand 20 and a spring element 21 surrounding it.

In the exemplary embodiment shown, the spring element 21 is a cylindrical helical spring, which is attached with its end sections to both the wedge pivot frame 40a and the cable store 50. In the straight-ahead position, the spring element 21 is in a contracted, short position. The line strand 20 runs loosely through the interior of the spring element 21 and only rests on the spring element 21 with its underside under gravity. The line strand 20 is attached to the wedge pivot frame 40a with the aid of a strain relief means 42 in order to keep tensile forces of the line strand 20 away from the permanent connection to the wedge pivot frame plug-element 41.

Figure 5:
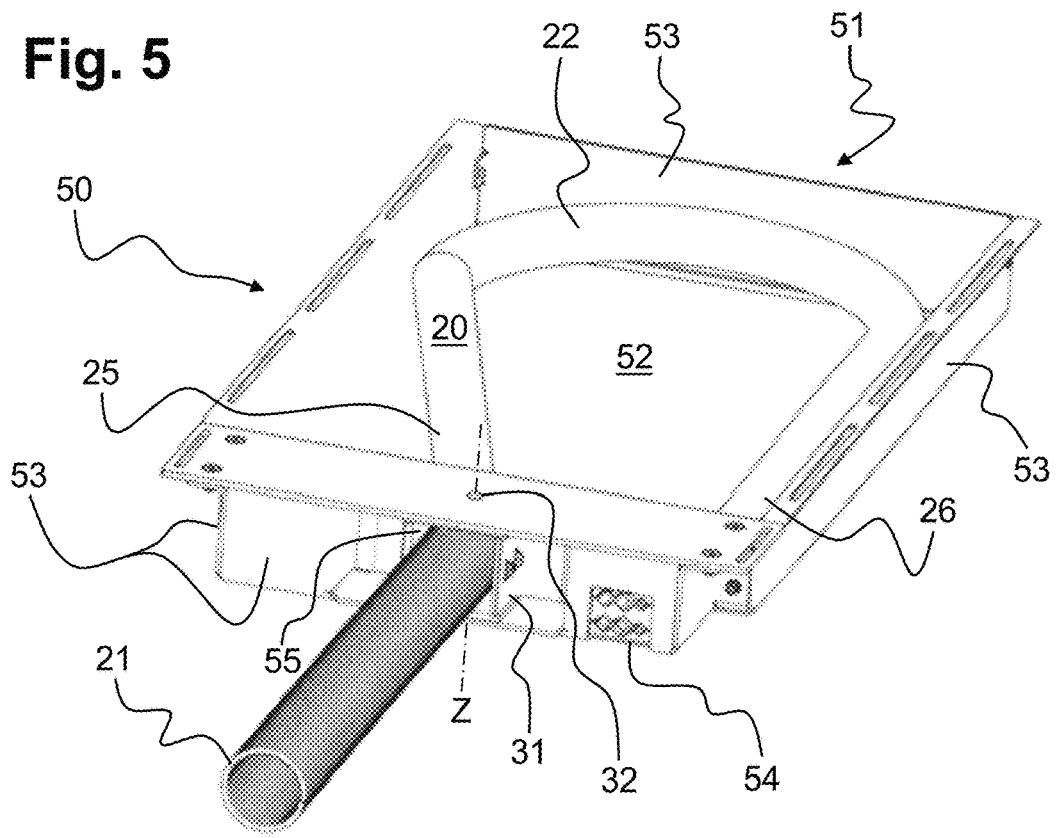
FIG. 5: a perspective view of a covered cable store with a line strand located therein and a connected spring element in a straight-ahead position.

As can be seen particularly clearly in FIG. 4 and FIG. 5, the cable store 50 comprises a box-shaped housing 51 with a bottom wall 52 and side walls 53 projecting thereon, which in the assembled position according to FIG. 1 rest against the front of the trailer floor 11 or a chassis component 13. The spring element 21 is fastened centrally on the side wall 53 of the housing 51 facing the wedge pivot frame 40a and the line strand 20 entering the housing 51 with its incoming section 25 through an opening 55 (see FIG. 5) formed in the side wall 53. For a particularly smooth entry and exit of the line strand 20 into and from the cable store 50, a support roller 56 is rotatably mounted within the housing 51 laterally offset and adjacent to the opening 55, wherein the support roller 56 ensures uniform movement of the line strand 20, particularly when the incoming section 55 moves out.

Within the housing 51 of the cable store 50, the line strand 20 is stored in a single loop 22 in one plane, in particular on the bottom wall 52 of the housing 51.

In the straight-ahead position of the wedge pivot frame 40a, the loop 22 has a maximum length $I_{max}$. An outgoing section 26 of the line strand 20 is connected to a cable store plug-element 54, via which the cable store 50 can in turn be connected to the on-board electrical system of the semi-trailer 10a. The cable store plug-element 54 is also inserted into the side wall 53 of the housing 51 facing the wedge pivot frame 40a. In the straight-ahead position, the incoming section 25 and the outgoing section 26 lie on opposite sides of the bottom wall 52, adjacent to their nearest side wall 53.

Figure 6:
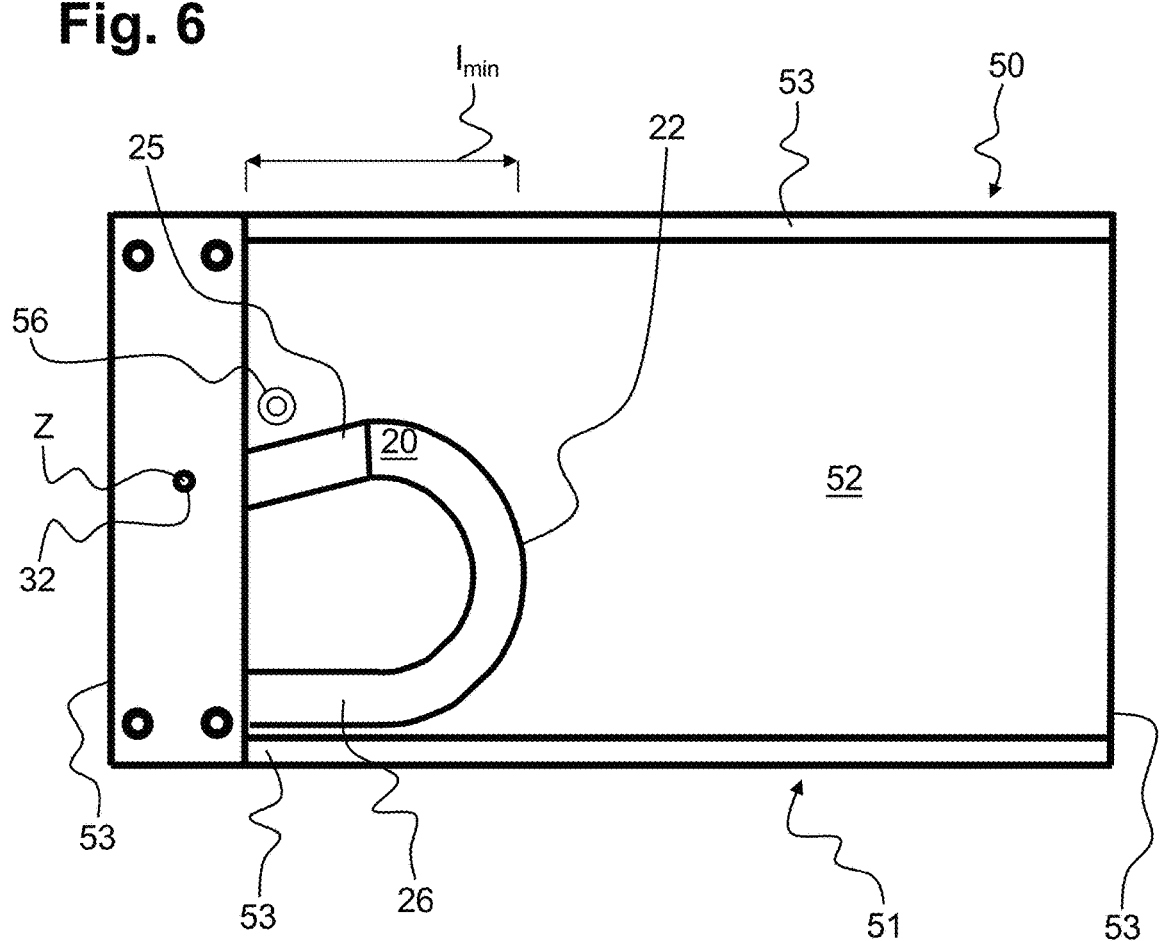
FIG. 6: a top view of a covered cable store with a line strand located therein in a cornering position.

FIG. 6 illustrates a situation of the line strand 20 pulled out of the cable store 50 in a cornering position, in which the loop 22 has moved to the left in the image plane in the direction of the side wall 53 facing the wedge pivot frame 40a. The radius of the loop 22 has been reduced, as has the length, which has now reached a minimum loop length $I_{min}$.

Figure 7:
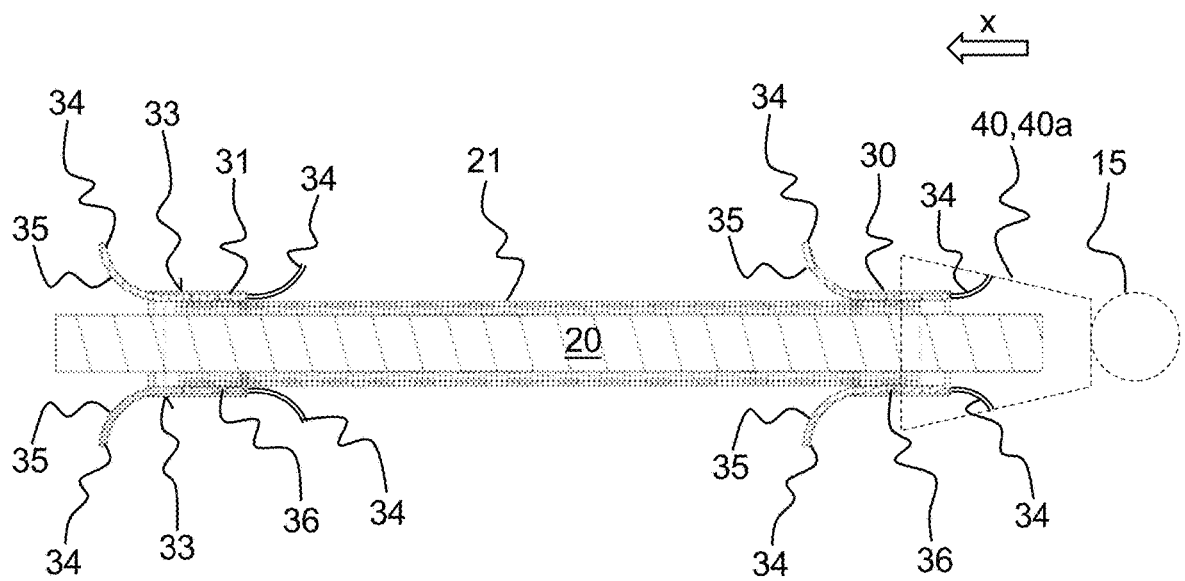
FIG. 7: a longitudinal section through a line strand with a spring element and a front and rear guidance console attached to it.

FIG. 7 shows a longitudinal section of the line strand 20 with the spring element 21 surrounding it. The spring element 21 is attached to the wedge pivot frame 40a by means of a front guidance console 30 and to the housing 51 of the cable store 50 by means of a rear guidance console 31. The front guidance console 30 is designed to be identical to the rear guidance console 31. The front and rear guidance consoles 30, 31 are each mounted about a vertical pivot axis z with the aid of a pivot bearing 32 (see FIG. 8). The pivot bearing 32 of the front guidance console 30 engages the wedge pivot frame 40a. The rear guidance console 31 is inserted into the opening 55 of the housing 51 of the cable store 50 and is mounted relative to the housing 51 by means of the associated pivot bearing 32.

In addition, guiding elements 34 are formed on opposite sides 33 of the front and rear guidance consoles 30, 31, which are curved laterally and outwards in the rearward direction x and protrude relative to the front and rear guidance consoles 30, 31. In the top view, each guiding element 34 or its inner side 35 of the front or rear guidance console 30, 31 completes an arc of approximately 90°, opposite one another with opposite senses of direction. On the front and rear guidance consoles 30, 31, guiding elements 34 curved laterally and outwards in pairs are also provided opposite to the rear direction x.

In a straight-ahead position of the wedge pivot frame 40a, the guiding elements 34 are arranged at a distance from the spring element 21 and therefore have no function. However, as soon as a cornering position occurs, the wedge pivot frame 40a moves laterally outwards relative to the cable store 50 and the spring element 21 would be subject to an irreversible buckling load in the area of the wedge pivot frame 40a or in the area of the opening 55 of the housing 51. With the help of the front and rear guidance console 30, 31, this initially rotates together with the attachment of the spring element 21. In an even tighter cornering position, the spring element 21 nestles against the inner side 35 of the respective guiding element 34 on the inside of the curve, whereby buckling load is largely avoided.

Figure 8:
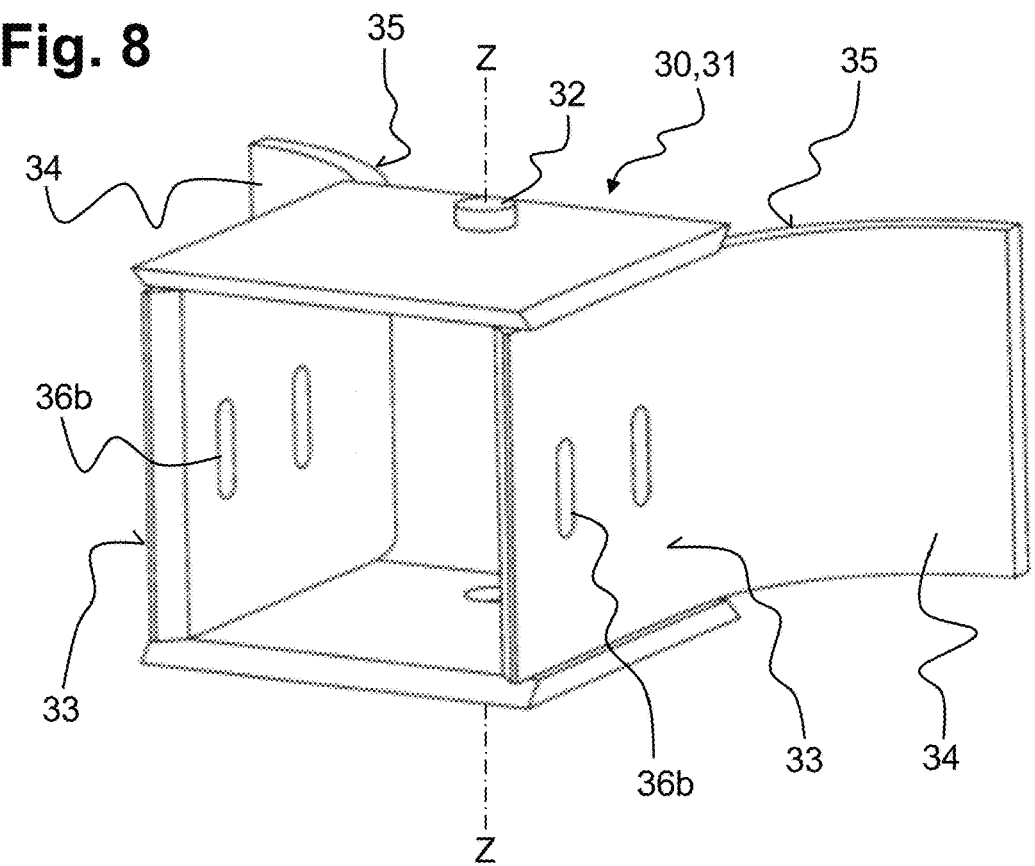
FIG. 8: a perspective view of a front or rear guidance console.
Figure 9:
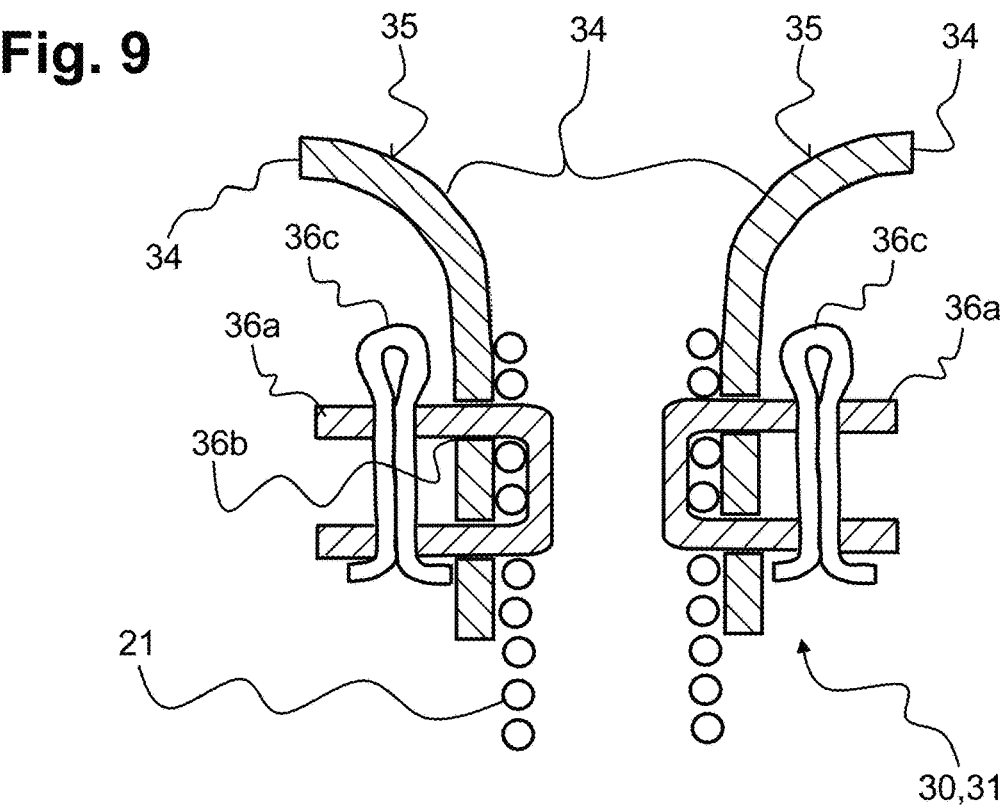
FIG. 9: a longitudinal section through a spring element attached to the front or rear guidance console.

FIG. 8 shows an enlarged perspective view of a front or rear guidance bracket 30, 31 and FIG. 9 its exemplary attachment to the spring element 21 by means of a spring element fastener 36. The spring element fastener 36 comprises bracket openings 36b formed in the opposite sides 33 of the front or rear guidance bracket 30, 31, through which a U-shaped bracket 36a is inserted and secured against loss, in particular by a safety pin 36c. The bracket 36a can, for example, be inserted from the inside first through the turns of the spring element 21 and then through the bracket openings 36b. The associated safety pin 36c passes through the free legs of the bracket 36a outside the front or rear guidance console 30, 31.

It is also possible to provide the two ends of the bracket 36a with a thread, instead of using a safety pin 36c, to screw a nut onto the thread and to pre-tension the bracket 36a in this way, so that the spring element 21 is pressed from the inside against the wall of the front or rear guidance console 30, 31 and held there in a clamping manner.

Figure 10:
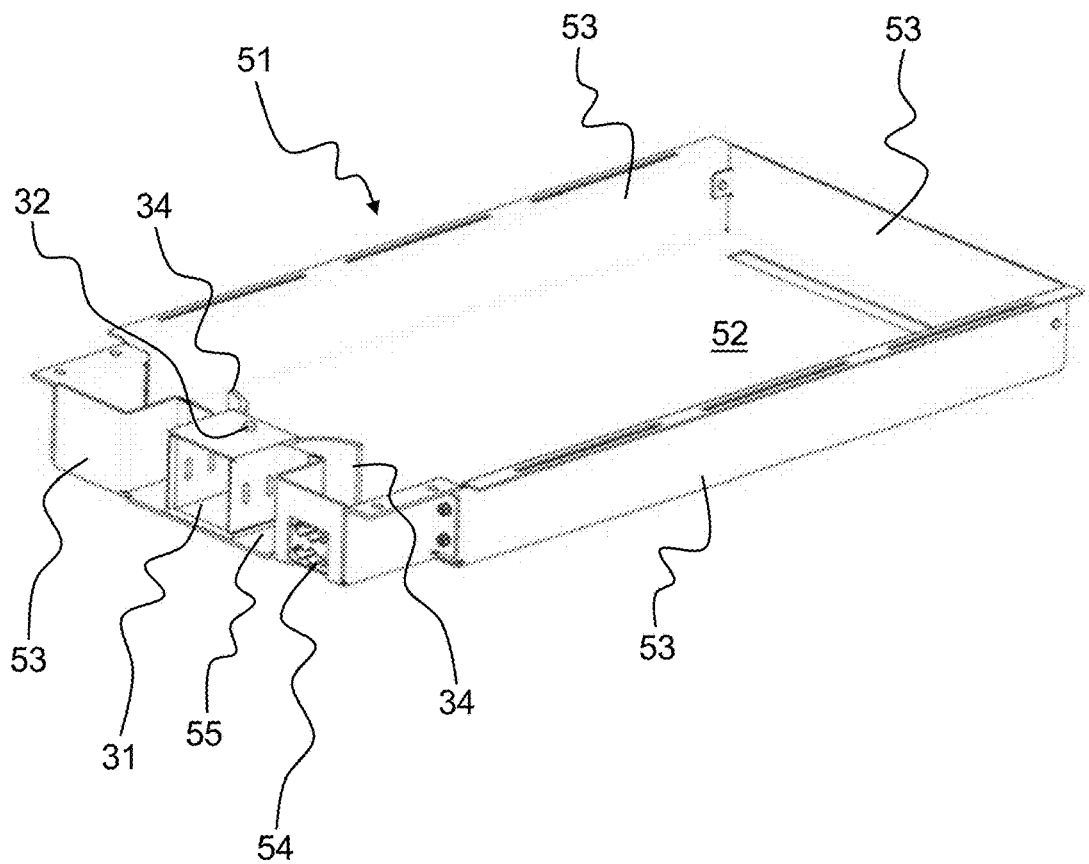
FIG. 10: a perspective view of a housing of the cable store with rear guidance console and cable store plug-element.

In FIG. 10, the housing 51 of the cable store 50 can be seen in a perspective view. In the side wall 53 facing the wedge pivot frame 40a, there is an opening 55 in a central position, into which the rear guidance console 31 is inserted and through which the line strand 20 in turn enters the cable store 50. Directly to the side of the opening 55 and next to the rear guidance console 31, the cable store plug-element 54 is inserted into the same side wall 53, with the help of which the cable store 50 can be connected to the on-board electrical system of the semi-trailer 10a.

Figure 11:
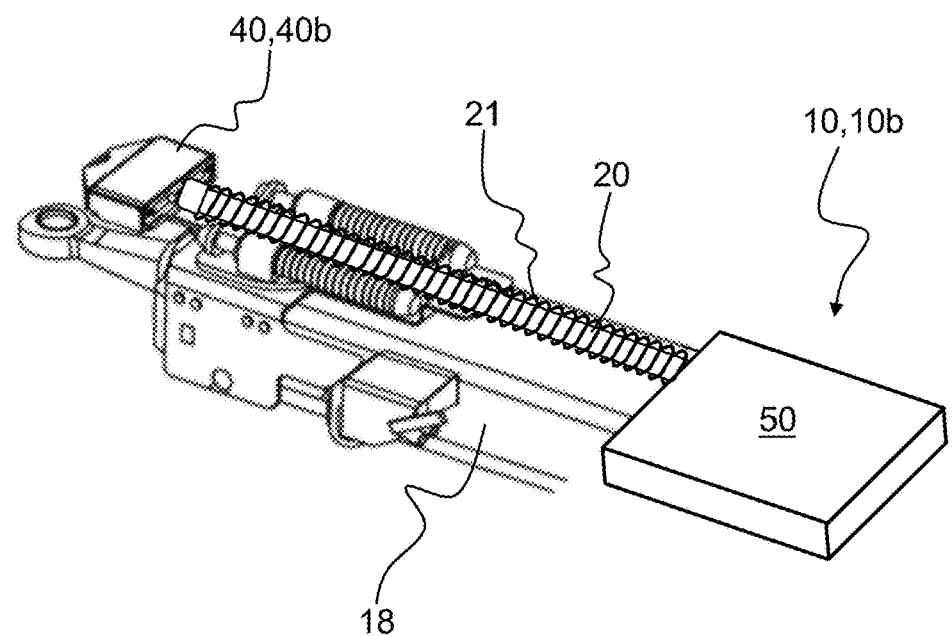
FIG. 11: a perspective view of a drawbar of a trailer with a cable store mounted on it and a carrier element in form of a connector console.

FIG. 11 shows the front end of a vehicle 10 in the form of a trailer 10b, which can be coupled to a towing vehicle, not shown here, by means of a drawbar 18. On the top of the drawbar 18, a carrier element 40 is arranged as a connector console 40b, which is inserted into a complementary shaped plug socket of the towing vehicle to establish an electrical and pneumatic connection. The connector console 40b can be pivoted about its vertical axis relative to the drawbar 18 in order to be able to pivot with the plug socket of the towing vehicle when cornering and to ensure a constant connection of the connector console 40b to the plug socket on the towing vehicle side.

The change in position of the connector console 40b in relation to the drawbar 18 is compensated for by means of the fixed cable store 50 attached to the drawbar 18, into which the line strand 20 engaging the connector console 40b runs. The cable store 50 structurally corresponds to the design explained in FIGS. 1 to 10.

In this embodiment, too, the line strand 20 is completely surrounded in the circumferential direction by the spring element 21, which is attached to both the connector console 40b and the cable store 50. With the help of the spring element 21, the line strand 20 is guided in the axial direction, can escape from the cable store 50 when cornering and can be pushed back into the cable store 50 when driving straight ahead due to its flexural rigidity. In the illustration of FIG. 11, the carrier element 40 in the form of the connector console 40b is in a straight-ahead position, in which the spring element 21 is compressed and a maximum section of the line strand 20 is accommodated by the cable store 50.

Figure 12:
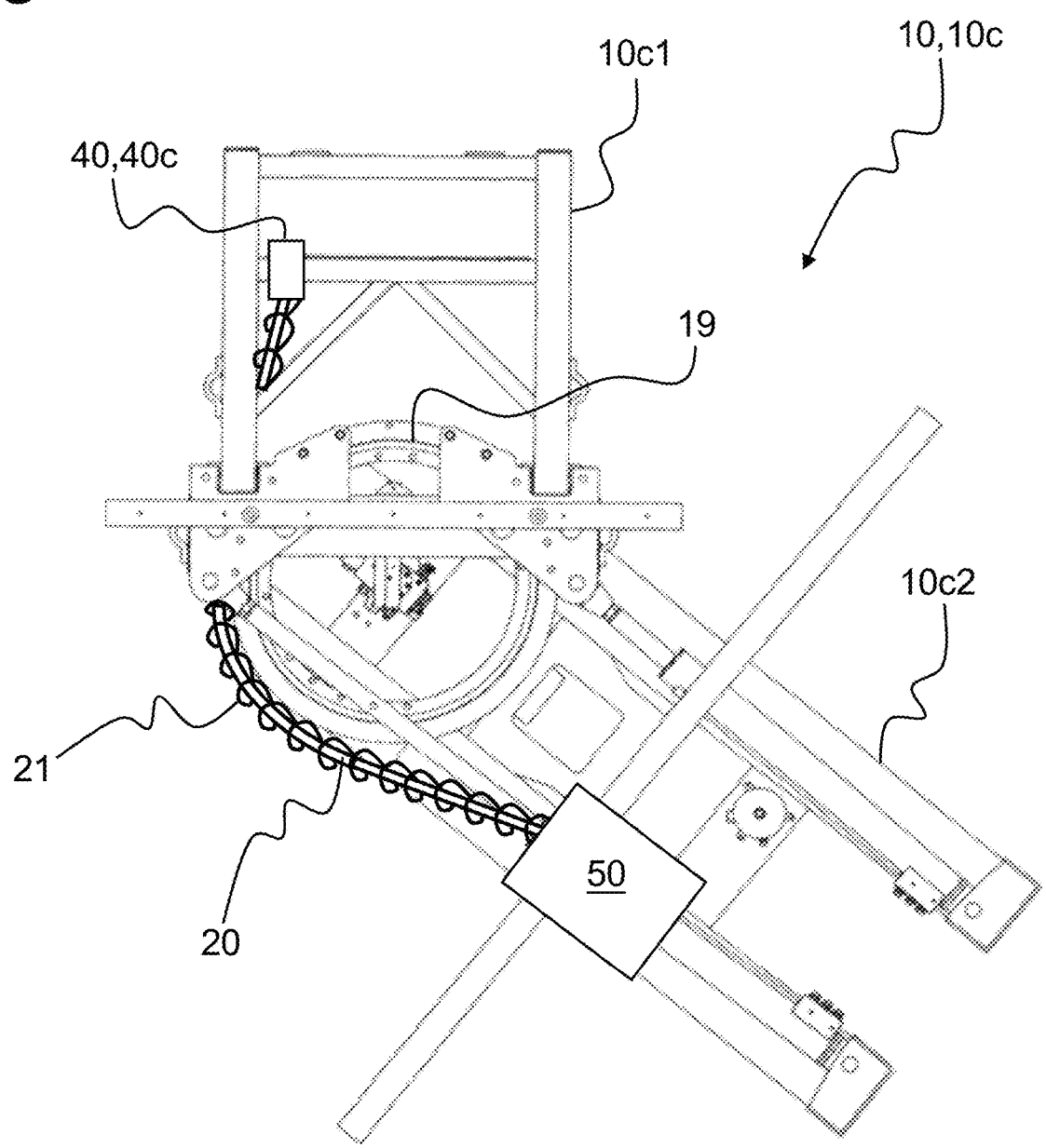
FIG. 12: a top view of an articulated vehicle with a carrier element mounted on the first vehicle part in form of a collecting console and the cable store mounted on the second vehicle part.

FIG. 12 illustrates in a further exemplary embodiment the attachment of the cable routing device to a vehicle 10 in the form of an articulated vehicle 10c or to its frame components. The articulated vehicle 10c has a first vehicle part 10c1 and a second vehicle part 10c2, which are connected to one another via a swivel joint 19 arranged between them. In the illustration according to FIG. 12, the articulated vehicle 10c is in a cornering position in which the first vehicle part 10c1 is angled towards the second vehicle part 10c2 at the swivel joint 19.

The line strand 20 runs from the first vehicle part 10c1 via the swivel joint 19 to the second vehicle part 10c2. Since the relative position of the first and second vehicle parts 10c1, 10c2 changes constantly during driving, it is necessary to also adapt the line strand 20 to the respective bending position of the first and second vehicle parts 10c1, 10c2. This adjustment is carried out by means of the cable store 50. The line strand 20 is attached to the carrier element 40 in the form of a collecting console 40c, placed on one side on the outer circumference of the swivel joint 19 and runs from there into the cable store 50. The line strand 20 is held by the spring element 21 along the entire route from the cable store 50 to the collecting console 40c and is loosely stored in it. Due to the bending position of the first and second vehicle parts 10c1, 10c2, the spring element 21 is in a stretched position, which is released when returning to the straight-ahead position.

In this embodiment, too, the line strand 20 passes in sections out of and into the cable store 50 exclusively due to its bending rigidity, kinematically decoupled from the spring element 21, which only supports the line strand 20 and prevents it from sagging.

LIST OF REFERENCE NUMERALS 10 vehicle
10a semi-trailer
10b trailer
10c articulated vehicle
10c1 first vehicle part articulated vehicle
10c2 second vehicle part articulated vehicle
11 trailer floor
12 bottom
13 chassis component
13a longitudinal beam
14 front semi-trailers
15 king pin
16 fifth wheel coupling
17 Fifth wheel coupling entry opening
18 drawbar
19 swivel joint
20 line strand
21 spring element
22 loop
23a-f supply lines
24 protective hose
25 incoming section
26 outgoing section
30 front guidance console
31 rear guidance console
32 pivot bearing
33 opposite sides guidance console
34 guiding elements
35 inner side guiding element
36 spring element fastener
36a bracket
36b bracket openings
36c safety pin
40 carrier element
40a wedge pivot frame
40b connector console
40c collecting console
41 carrier element plug-element or wedge pivot frame plug-element
42 strain relief means
50 cable store
51 housing
52 bottom wall housing
53 side walls housing
54 cable store plug-element
55 opening
56 support roller
$l_{max}$ maximum loop length
$l_{min}$ minimum loop length
x rearward direction
Z pivot axis guidance console

What is claimed is:

1. A cable routing device for connecting a line strand to a carrier element which can be moved with respect to a vehicle, wherein the cable routing device has the carrier element, fastened pivotably to the vehicle, and a cable store, in which at least part of the line strand is accommodated, wherein a spring element is arranged between the carrier element and the cable store, by which spring element the line strand is supported loosely, wherein the line strand is supported by the spring element in such a way that only a sliding friction resulting from a weight of the line strand has to be overcome for axial movement of the line strand in relation to the spring element, wherein the line strand is inserted in the cable store as a loop, and wherein regardless of the relative position of the carrier element, a direction of the loop is always the same.

2. A cable routing device for connecting a line strand to a carrier element which can be moved with respect to a vehicle, wherein the cable routing device has the carrier element, fastened pivotably to the vehicle, and a cable store, in which at least part of the line strand is accommodated, wherein a spring element is arranged between the carrier element and the cable store, by which spring element the line strand is supported loosely, and wherein the line strand is supported by the spring element in such a way that only a sliding friction resulting from a weight of the line strand has to be overcome for axial movement of the line strand in relation to the spring element, and wherein during cornering of the vehicle, the carrier element changes its position relative to the cable store, so that the distance between the carrier element and the cable store increases and the line strand has to bridge this larger distance.

3. The cable routing device according to claim 2, wherein the spring element is attached to the carrier element and/or to the cable store.

4. The cable routing device according to claim 2, wherein the line strand is inserted in the cable store as a loop.

5. The cable routing device according to claim 4, wherein regardless of the relative position of the carrier element, a direction of the loop is always the same.

6. The cable routing device according to claim 4, wherein in a straight-ahead position of the carrier element whereby a longitudinal axis of the carrier element is aligned in a longitudinal axis of the vehicle, the loop within the cable store has a maximum loop length ($I_{max}$).

7. The cable routing device according to claim 4, wherein in a cornering position of the carrier element whereby a longitudinal axis of the carrier element is oriented approximately 90° in relation to a longitudinal axis of the vehicle, the loop within the cable store has a minimum loop length ($I_{min}$).

8. The cable routing device according to claim 2, wherein the spring element is attached to the carrier element with a front guidance console and/or the spring element is attached to the cable store with a rear guidance console.

9. The cable routing device according to claim 8, wherein the front and/or rear guidance console is mounted by a pivot bearing about a vertical pivot axis (z) in an installed position.

10. The cable routing device according to claim 8, wherein guiding elements which diverge outwards are arranged on opposite sides of the front and/or rear guidance console.

11. The cable routing device according to claim 10, wherein the guiding elements protrude backwards and/or forwards in the installed position with respect to the front and/or rear guidance console.

12. The cable routing device according to claim 10, wherein mutually facing inner sides of the guiding elements are designed with a curvature in opposite directions.

13. The cable routing device according to claim 2, wherein the line strand comprises a plurality of supply lines, which are encased and/or held together by at least one protective hose.

14. The cable routing device according to claim 2, wherein a carrier element plug-element is provided on the carrier element and/or a cable store plug-element is provided on or adjacent to the cable store.

15. A combination of the cable routing device according to claim 2, with the vehicle designed as a semi-trailer, wherein the carrier element is a wedge pivot frame which can be pivoted about a king pin.

16. The combination according to claim 15, wherein the cable store is arranged under a trailer floor of the semi-trailer.

17. The combination according to claim 15, wherein the cable store is attached to an underside of the trailer floor, a chassis component or an attachment of the semi-trailer.

18. A combination of the cable routing device according to claim 2 with a vehicle designed as a trailer, wherein the carrier element is a connector console which is movably mounted to a drawbar.

19. The combination according to claim 18, wherein the cable store is attached to or mounted stationary to the drawbar of the trailer.

20. A combination of the cable routing device according to claim 2 with the vehicle designed as an articulated vehicle, the articulated vehicle having a first and second vehicle part separated from one another by a swivel joint, wherein the carrier element is a collecting console arranged on the first vehicle part.

21. The combination according to claim 20, wherein the cable store is attached to or mounted stationary to the second vehicle part.

22. A cable routing device for connecting a line strand to a carrier element which can be moved with respect to a vehicle, wherein the cable routing device has the carrier element, fastened pivotably to the vehicle, and a cable store, in which at least part of the line strand is accommodated,
wherein a spring element is arranged between the carrier element and the cable store, by which spring element the line strand is supported loosely,
wherein the line strand is supported by the spring element in such a way that only a sliding friction resulting from a weight of the line strand has to be overcome for axial movement of the line strand in relation to the spring element,
wherein the line strand is inserted in the cable store as a loop, and
wherein in a cornering position of the carrier element whereby a longitudinal axis of the carrier element is oriented approximately 90° in relation to a longitudinal axis of the vehicle, the loop within the cable store has a minimum loop length ($I_{min}$).

* * * * *